United States Patent [19]

Koizumi

[11] Patent Number: 5,317,419

[45] Date of Patent: May 31, 1994

[54] IMAGE RECOGNITION APPARATUS

[75] Inventor: Noboru Koizumi, Hachioji, Japan

[73] Assignee: Konica Corporation, Tokyo, Japan

[21] Appl. No.: 909,631

[22] Filed: Jul. 7, 1992

[30] Foreign Application Priority Data

Aug. 7, 1991 [JP] Japan .................................. 3-197787
Aug. 23, 1991 [JP] Japan .................................. 3-212164
Aug. 30, 1991 [JP] Japan .................................. 3-220243

[51] Int. Cl.$^5$ ............................................. H04N 1/40
[52] U.S. Cl. .................................. 358/462; 358/456; 358/466
[58] Field of Search ............... 358/462, 296, 466, 486, 358/456, 534, 496, 459, 453, 451, 460, 302, 445, 448, 455; 355/38, 251, 246, 71, 208, 214

[56] References Cited

U.S. PATENT DOCUMENTS

| | | | |
|---|---|---|---|
| 4,004,079 | 1/1977 | Boston | 358/256 |
| 4,194,221 | 3/1980 | Stoffel | 358/283 |
| 4,447,830 | 5/1984 | Stoffel | 358/283 |
| 4,540,276 | 9/1985 | Ost | 355/38 |
| 4,693,593 | 9/1987 | Gerger | 355/14 CH |
| 4,712,141 | 12/1987 | Tomohisa et al. | 358/280 |
| 5,172,248 | 12/1992 | Urabe et al. | 358/456 |
| 5,243,444 | 9/1993 | Fan | 358/456 |

Primary Examiner—Paul Ip
Attorney, Agent, or Firm—Frishauf, Holtz, Goodman & Woodward

[57] ABSTRACT

An image processor for processing image signals corresponding to an original image including a character image region, a halftone image region, and a continuous tone image region. The image processor includes a generator of a first kind of image signals corresponding to the character image region, and of a second kind of image signals corresponding to the halftone image region and the continuous tone image region, according to the image signals; a processor of the first image signals; and a processor of the second image signals. The generator includes a converter to convert the image signals into binarized image signals, which express the image with a black pixel and a white pixel, according to the density level of respective pixels of the image; a recognition circuit that recognizes partial image regions, each of which has a predetermined number of pixels in the image, as black regions when more than a predetermined number of the black pixels exist in each of the partial image regions, so that the original image comprises at least one of the group of the black regions and the group of a non-black regions; and an estimation circuit of a continuous length of the black regions.

7 Claims, 11 Drawing Sheets angle A
(400~200%)

angle B
(200~150%)

angle C
(150~75%)

angle D
(75~50%)

IMAGE RECOGNITION APPARATUS

BACKGROUND OF THE INVENTION

The present invention relates to an image recognition apparatus which recognizes whether an inputted image is a character image or a halftone image.

Various image recognition apparatus to recognize a character image region, a halftone image region or a continuous tone image region have been proposed.

After an image has been recognized by such an image recognition apparatus, image processing appropriate for the image is carried out at each image region by an image processing apparatus.

Image processing is conducted as follows:

With regard to a character image, the edge portion is preferably emphasized. On the other hand, with regard to a halftone image or a continuous tone image, smoothing is conducted so that noises such as moire stripes and the like can be mitigated. Therefore, it is important to recognize the region of an image before image processing is carried out.

When consideration is given to photographic density, it is rather easy to recognize a photographic image and a character image or to recognize a photographic image and a halftone image. However, it is very difficult to recognize a character image and a halftone image.

In the case where a halftone image is mistakenly recognized as a character image, moire stripes caused by a mutual action of the pitch of halftone and that of pixels, is emphasized due to the aforementioned edge emphasizing processing. As a result, a good image can not be obtained.

The present invention has been achieved in order to solve the aforementioned problems in the prior art. It is a primary object of the present invention to provide an image recognition apparatus which can accurately recognize a halftone image and a character image.

SUMMARY OF THE INVENTION

In order to solve the aforementioned problems, the first example of the present invention comprises a character image processing means to process a character image, a halftone/continuous tone processing means to process an image and a continuous tone image, an image judging means to judge whether the image is a character and a halftone or continuous tone image with regard to each image region in which both images exist, an image selection means which selectively passes one of the image processing output of the character image processing means and that of the halftone/continuous tone processing means according to the judgment result of the image judgment means, wherein the image judgment means includes a binarizing means which binarizes photographic density, a black region enlargement processing means which enlarges and detects a black region in a window of a predetermined number of pixels, and a black region continuation length detection means which judges the continuation length of an enlarged black region detected by the black region enlargement processing means.

In the image processing apparatus of the present invention, an image in which both a character and halftone image, and a continuous tone image exist, is binarized by the binarizing means, and then the black portion is enlarged by the black region enlargement processing means. After that, the black region continuation length is detected by the black region continuation length detection means. When an amount of the continued black region is not less than a predetermined value, the image is recognized as a halftone image or a continuous tone image, and when the amount of the continued black region is smaller than the predetermined value, the image is recognized as a character image.

In order to solve the aforementioned problems, the second example of the present invention comprises a density information grouping means which groups luminance or density data of a plurality of pixels having a predetermined inclination angle $\theta$ with regard to the primary scanning direction or the auxiliary scanning direction, a density cycle detection means which detects a variation of luminance or density data grouped by the aforementioned density information grouping means in the case where the cycle of the data is smaller than a predetermined value, and an image recognition means which recognizes an image according to the detection result obtained by the aforementioned density cycle detection means.

Inclination angle $\theta$ of luminance or density data which is grouped by the density information grouping means, is not less than 30° and not more than 60°.

Inclination angle $\theta$ is preferably 45°.

In the second example of the image recognition apparatus of the present invention, the image recognition means recognizes the kind of an image referring to the existence of a variation of density information, the cycle of which is not more than a predetermined value, wherein the density information is of a plurality of pixels which have been grouped by the density cycle detection means so that the pixels have a predetermined inclination angle $\theta$.

Originally, it is preferable that inclination angle $\theta$ is the same as the screen angle of a halftone image. However, it is difficult to adjust inclination angle $\theta$ when the screen angle of the halftone image is judged. Therefore, inclination angle $\theta$ is set at an angle not less than 30° and not more than 60° which is most frequently used as the screen angle of a monochromatic halftone image. More preferably, when inclination angle $\theta$ is set at 45°, the detection of luminance or density data can be improved.

There are copiers having the function of variable magnification (elongation and reduction). When a variable magnifying operation is conducted in these copiers, the data rate in the primary scanning direction is not changed, however, the scanning speed in the auxiliary direction is changed, so that image data is magnified and reduced in the auxiliary direction. For example, a halftone image arranged diagonally is viewed in the scanner output as if it was arranged vertically or horizontally. For that reason, it becomes difficult to recognize a character image and a halftone image in the second example. Therefore, the inventors propose the following third example to solve the aforementioned problems.

The third example is to provide an image recognition apparatus recognizing an image which has been read out by a scanner, the variable magnification ratio of the auxiliary direction of which can be set by a setting operation conducted from the outside when the auxiliary scanning speed of an image reading apparatus in which an optical reading sensor having a plurality of image reading sections in the primary scanning direction conducts scanning in the auxiliary direction, is changed, wherein the aforementioned image recognition apparatus comprises: a density information grouping means which groups luminance or density data given by the aforementioned scanner; a density cycle detection means which detects a variation of luminance or density data grouped by the aforementioned density information grouping means in the case where the cycle of the data is smaller than a predetermined value; an image recognition means which recognizes an image according to the detection result obtained by the aforementioned density cycle detection means; and a grouping control means which receives information of the variable magnification ratio of the scanner and changes the arrangement of data when luminance or density data is grouped by the density information grouping means.

In the third example of the present invention, a plurality of pieces of information are grouped in accordance with the information of the variable magnification ratio by the density information grouping means. Periodic changes of the plurality of pieces of information which have been grouped, are detected by the density cycle detection means. Images are recognized by the image recognition means in accordance with the periodic changes.

DETAILED DESCRIPTION OF THE INVENTION

With reference to the attached drawings, the first example of the present invention will be explained in detail as follows.

Figure 1:
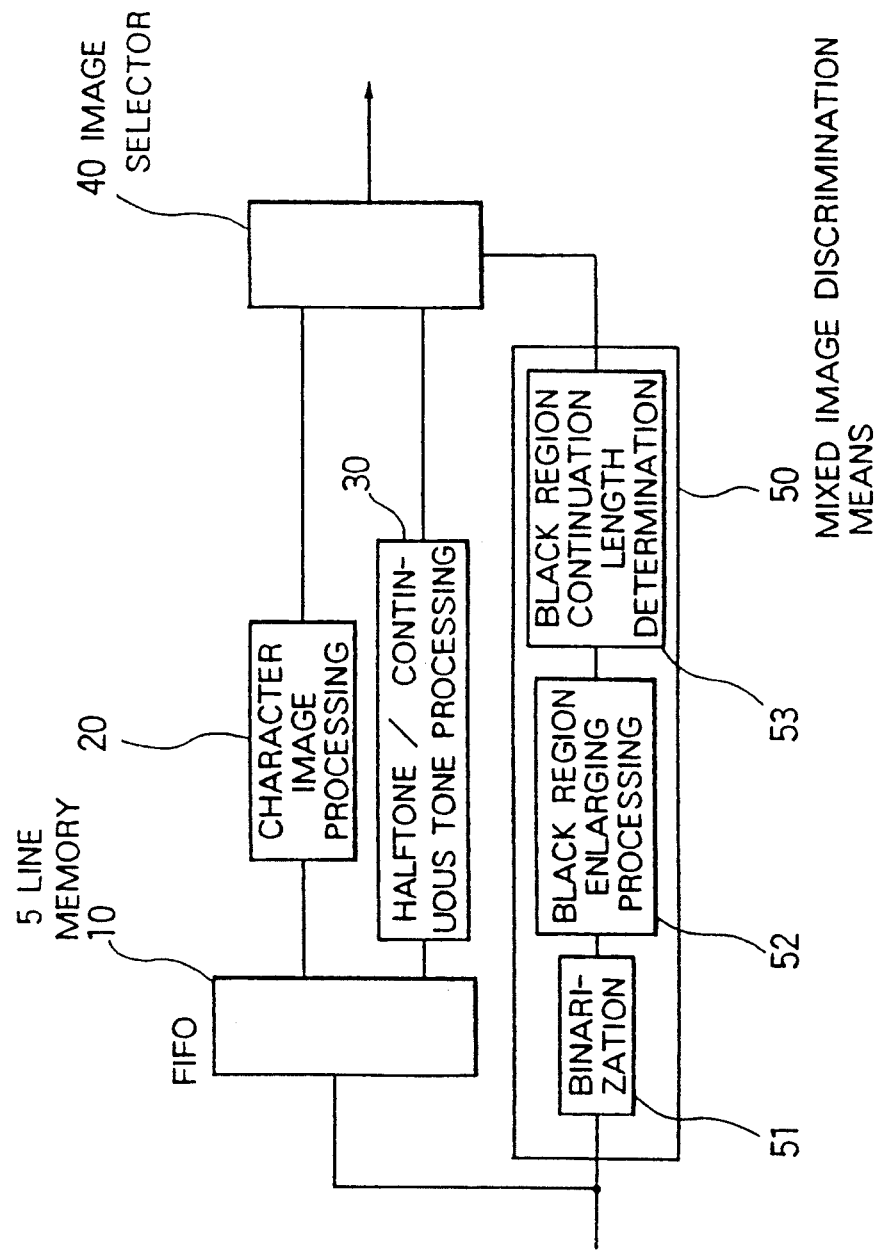
FIG. 1 is a schematic illustration showing the outline of structure of the first example of the present invention.
Figure 2:
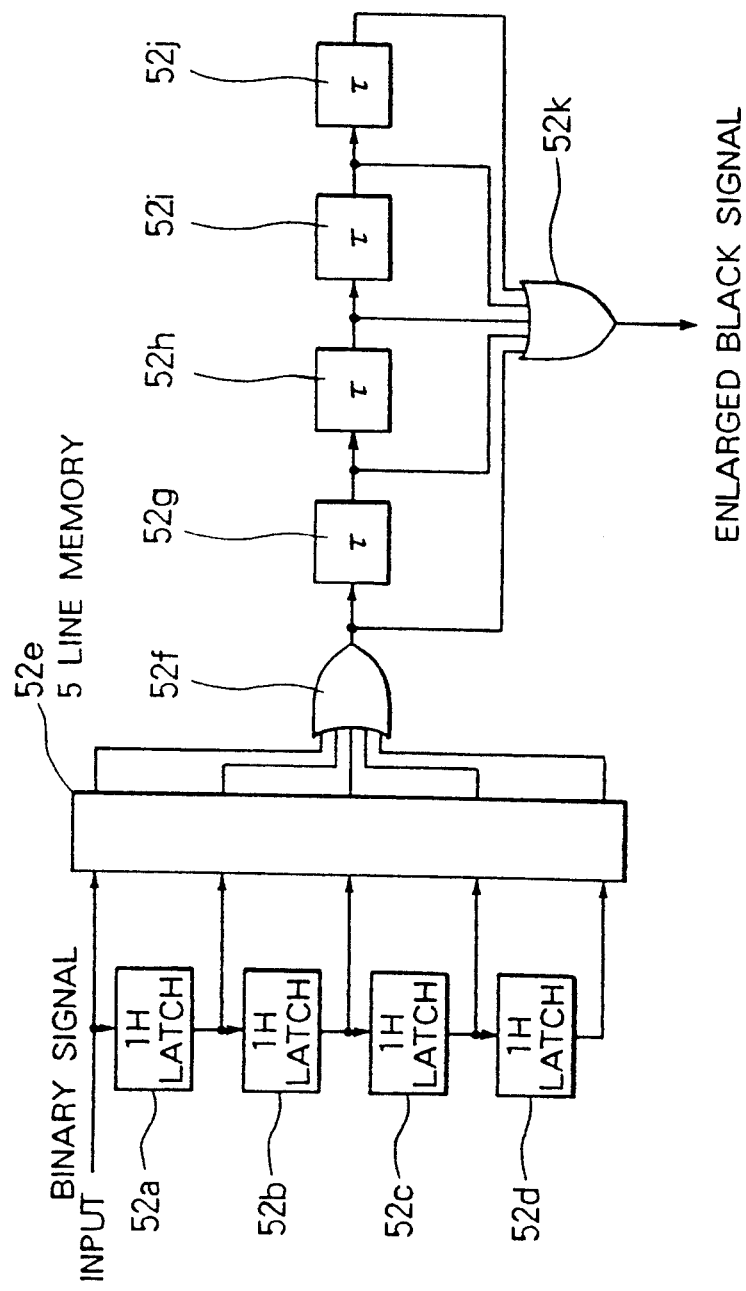
FIG. 2 is a schematic illustration showing the detailed structure of the main portion of the example shown in FIG. 1.
Figure 3:
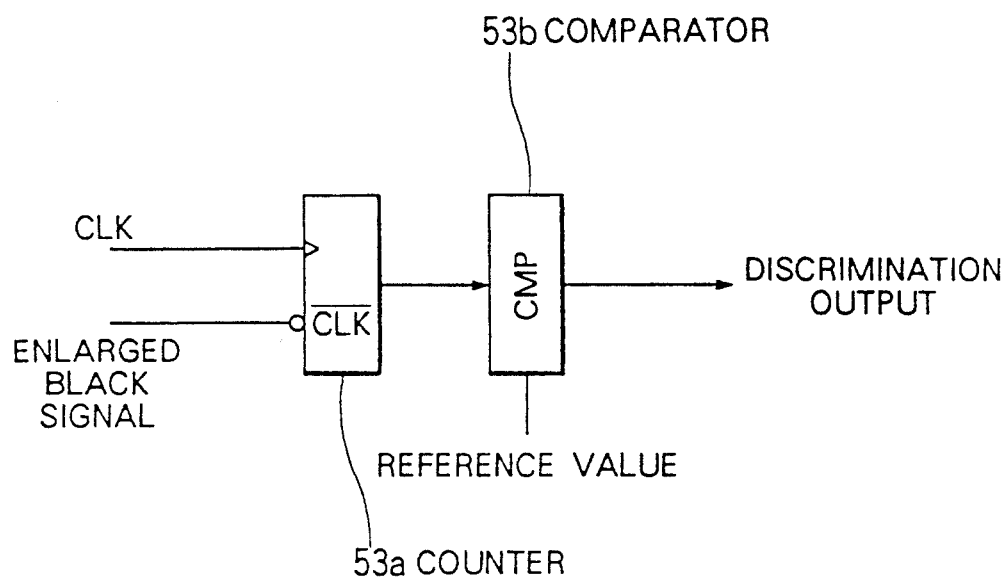
FIG. 3 is a schematic illustration showing the detailed structure of the main portion of the example shown in FIG. 1.

FIG. 1 is a schematic illustration showing the entire structure of the first example. FIG. 2 is a schematic illustration showing the detailed structure of the main portion of the example shown in FIG. 1. FIG. 3 is a schematic illustration showing the detailed structure of the main portion of the example shown in FIG. 1. In these drawings, numeral 10 is a 5 line memory constituted of an FIFO memory, numeral 20 is a character image processing means which conducts image processing appropriate for a character image, numeral 30 is a halftone/continuous tone processing means which conducts image processing appropriate for a halftone dot image and a continuous tone image, numeral 40 is an image selector which selects one of the output of the character image processing means 20 and the output of the halftone/continuous tone processing means 30, and numeral 50 is a mixed image discrimination means which discriminates whether an input image is a character image, or a halftone image or a continuous tone image.

The mixed image discrimination image 50 includes a binarization means 51 which binarizes density data of an image, a black region enlarging processing means 52 which enlarges and detects a black region in a window of a predetermined pixel number, and a black region continuation length determination means 53 which determines the continuation length of the black region detected by the black region enlarging processing means 52.

The black region enlarging processing means 52 includes 1H latches 52a to 52d which give delay time coincident with 5H (H is an abbreviation of horizontal cycle) to a binary signal at each 1H, a 5 line memory 52e which holds the binary signal given delay time coincident with 5H, an OR-gate 52f which adds the output of the 5 line memory 52e, delay means 52g to 52j which give delay time coincident with 5 clocks to the output of the OR-gate 52f at one clock, and an OR-gate 52k which adds the binary signal to which delay time coincident with 5 clocks is given.

The black region continuation length determination means 53 includes a counter 53a which counts the output (the enlarged black region signal) of the black region enlarging processing means 52 in accordance with clock signal CLK, and a comparator 53b which compares a count value of the counter 53a with a predetermined reference value.

Operations of the apparatus of this example constituted in the manner described above, will be described as follows.

Image density data read out with a scanner not shown, is supplied to the 5 line memory 10 and the mixed image discrimination means 50. Mixed image discrimination conducted in the mixed image discrimination means 50 which features the present example, will be explained here.

Density data sent from the scanner is binarized by the binarization means 51. When the data is black, "1" is outputted from the binarization means 51, and when the data is white, "0" is outputted from the binarization means 51.

Then, black region enlarging processing is conducted by the black region enlarging processing means 52 shown in FIG. 2. According to the black region enlarging processing mentioned above, even when one black spot has been found in a window of predetermined dimensions (in this example, the dimensions of the window are 5×5), the entire black region is assumed to be a black region. That is, binary signals coincident with 5H which are delayed at each 1H, are generated by 1H latches 52a to 52d. Then, binary signals coincident with 5H are added by OR-gate 52f. Next, delay time coincident with 5 clocks is given by the delay means 52g to 52j at each clock, and these signals are added in the OR-gate 52k so that the adding output of 5×5 window can be obtained. Accordingly, even when one black spot exists in the 5×5 window, an enlarged black region signal is outputted.

This enlarged black region signal is impressed upon a clear terminal of the counter 53a of the black region continuation length determination means 53. Accordingly, while the enlarged black region signal is "1", clock signal CKL continues to be counted up. This counted value is compared with a predetermined reference value by the comparator 53b.

Figure 4:
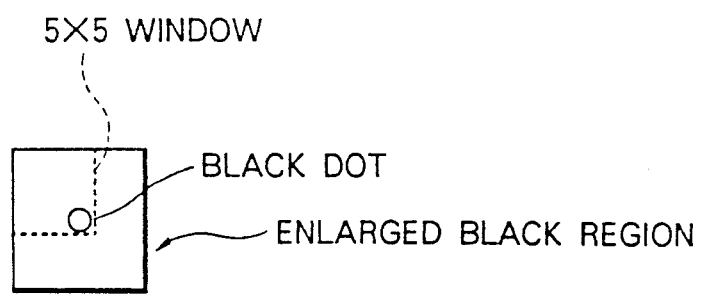
FIG. 4 is a schematic illustration to explain a black region enlargement processing.
Figure 5:
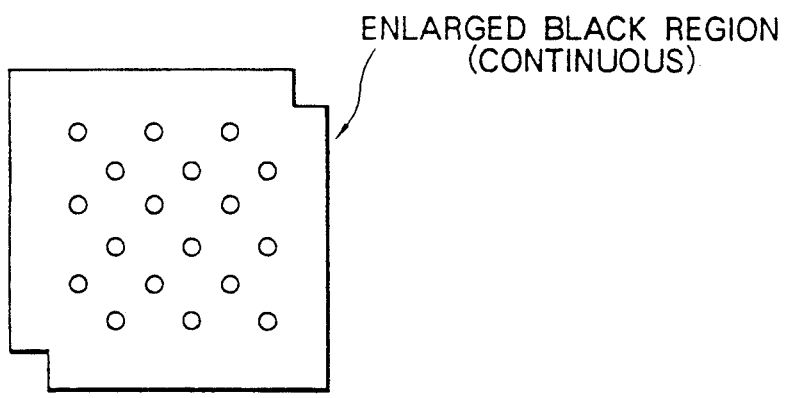
FIG. 5 is a schematic illustration showing a black region enlargement processing.

In the case of a halftone image, black spots exist at relatively periodic intervals. These black spots existing periodically are enlarged by the black region enlarging processing. FIG. 4 shows a circumstance in which one black spot is enlarged. The continuation length of the enlarged black region is discriminated by the black region continuation length discrimination processing. That is, when the black spots, such as a halftone image existing at periodical intervals, are enlarged, they overlap as shown in FIG. 5. Consequently, they are assumed to be continuous, and when the length of continuation is longer than a predetermined reference value, they are discriminated as halftone. It is preferable that the reference value is about 20 mm on an original image (in the case of scanner reading). Due to the foregoing, an isolated enlarged black region and a continuous enlarged black region can be discriminated. In the case of a photographic image, when the threshold value of the binarization means 51 is set appropriately, all portions except for a portion in which luminance is very high, become an enlarged black region, so that the portions are discriminated as a continuous tone region. In the case of letters of usual dimensions, there is a space between two letters. Accordingly, the continuous length of a black region is smaller than the reference value, so that letters can be discriminated from a continuous tone image.

Consequently, the image selector 40 into which a signal of the mixed image discrimination means 50 has been inputted, selectively passes either the output of the character image processing means 20 or that of the halftone/continuous tone processing means 30, according to the result of the discrimination. In the manner described above, the most appropriate image processing can be conducted on any of a character image, halftone image and continuous tone image.

In the case of especially large letters, correct discrimination can not be conducted occasionally. However, this is a case inside the bold lines composing letters, so that problems are not caused. As preprocessing of the first example, a region, the density of which does not vary sharply, may be previously separated as a photographic region. Due to the foregoing, it is sufficient to discriminate only character and halftone images.

As explained above, in the first example of the present invention, in the case of a mixed image in which a character image and a half tone image are mixed, the continuous length of an enlarged black region is detected. When the length of a continuous black region is not less than a predetermined value, the image is recognized as a half tone image, and when the length of a continuous black region is smaller than the predetermined value, the image is recognized as a character image. Due to the foregoing, it is possible to discriminate a halftone image and a character image correctly.

With reference to the attached drawings, the second example of the present invention will be explained in detail. The following explanations are conducted for the case in which the inclination angle of halftone is 45°. Concerning data processing of luminance or density, density data processing is taken for an example and explained.

Figure 6:
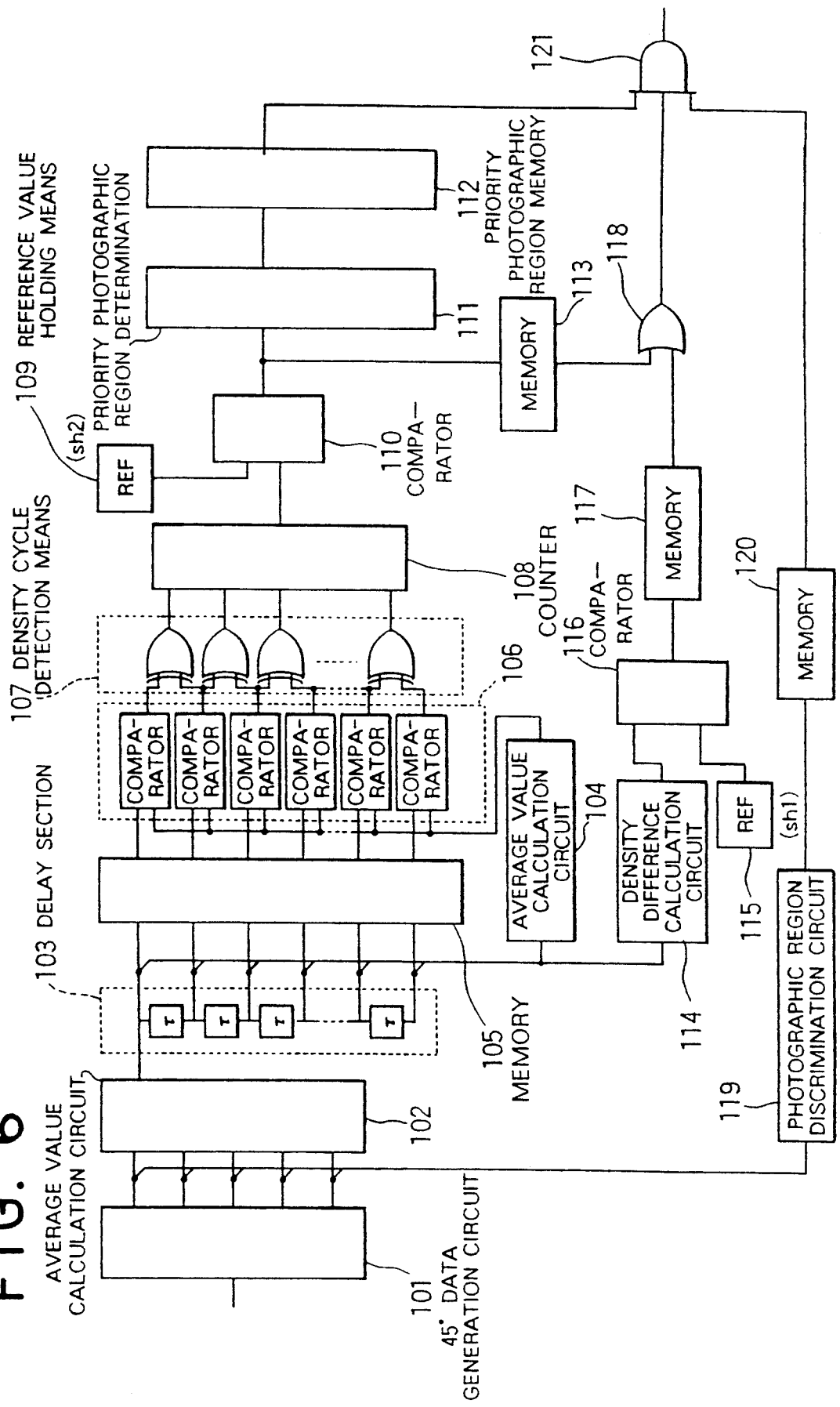
FIG. 6 is a schematic illustration showing the structure of the second example.
Figure 7:
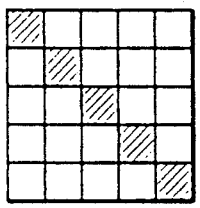
FIG. 7 is a a schematic illustration showing the circumstances in which luminance or density data of a plurality of pixels having inclination angle θ is grouped.
Figure 8:
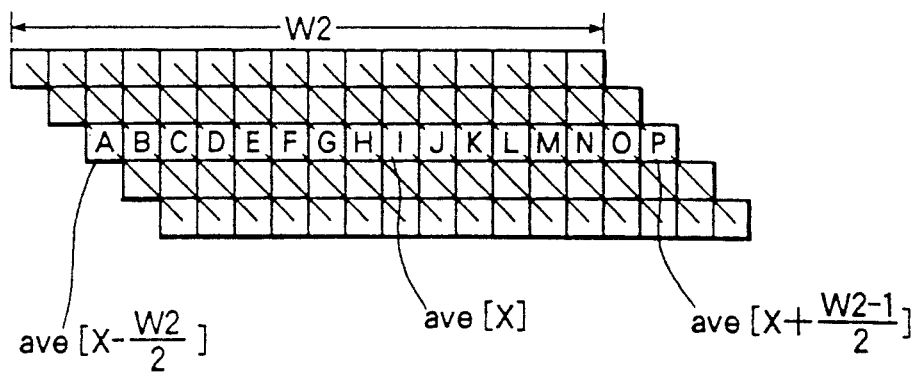
FIG. 8 is a schematic illustration explaining a change of grouped density information, the cycle of which is not more than a predetermined value.

FIG. 6 is a schematic illustration showing the entire composition of the example. In the drawing, a 45° data generation circuit 101 generates data which is shifted from image data (serial data) of a scanner by 45°, wherein the data is shown in FIG. 7. This 45° data generation circuit 101 includes a plurality of line memories or field memories (frame memories). An average value calculation circuit 102 calculates an average value of density from a plurality of image data (in the case of FIG. 7, 5 data) outputted from the 45° data generation circuit 101. A delay section 103 includes a plurality of delay elements (the number is w2) having one clock in the horizontal direction. In the delay section 103, averaged density information is delayed by one clock in the horizontal direction so that density information A to P shown in FIG. 8 is generated. Characters A to P denote an average of a plurality of pixel data (in this case, the number of pixel data is 5), wherein A to P are shown by the diagonal lines drawn in FIG. 8. An average value calculation circuit 104 calculates average value shm[x] of density information A to P generated in the delay section 103. On the other hand, a memory 105 generates delay time which is the same as the calculation time of the average value calculation circuit 104 so that output of the delay section 103 is supplied to a group of comparators 106. The group of comparators 106 compares average value shm[x] found by the average value calculation circuit 104 with density information A to P. When a density cycle detection means 107 including a plurality of exclusive "or" circuits, obtains an exclusive OR of the outputs of the comparators which are adjacent to each other so that the change of density information, the cycle of which is not more than a predetermined value, is detected. Strictly speaking, the periodicity is not discriminated here, but it is detected that data crosses the threshold value of the average value a large number of times. The aforementioned detection is a substitute means for a circuit which discriminates periodicity because a means to discriminate periodicity is disadvantageously expensive. A counter 108 counts "1" of the density cycle detection means 107. A reference value holding means 109 holds a reference value with respect to density cycle change, and this reference value and the counting result of the counter 108 are compared with each other by the comparator 110. A priority photographic region memory 112 is a line memory, and a photographic region (a priority photographic region) is set preferentially. The priority photographic region is set by a priority photographic region determination circuit 111 in accordance with the output of the comparator 110. According to the direction, the priority photographic region memory 112 determines the priority photographic region, wherein a margin coincident with a predetermined number of pixels (len2) is given to both sides of the priority photographic region. The determined value of the priority photographic region 112 is delayed by not less than len2×(data rate) in accordance with the command of the priority photographic region determination circuit 111, and then the value is timed with the output of an OR gate 118 and that of a memory 120 and outputted into an AND gate 121.

The priority photographic region memory 112 is cleared at each one horizontal line.

A density difference calculation circuit 114 calculates the difference between the maximum value and the minimum value of a plurality of density information (in this example, A to P) generated by the delay section 103. The comparator 116 compares the density difference with a predetermined reference value held by the reference value holding means 115. After a timing adjustment has been conducted on the result of the aforementioned comparison, the comparison result is supplied to the OR gate 118 together with the comparative output of the comparator 110 on which a timing adjustment had been conducted by the memory 113 in the same manner. OR output of the OR gate 118 is supplied to an AND gate 121 which will be described later.

Referring to the density information generated by the 45° data generation circuit 101, a photographic region discrimination circuit 119 discriminates whether it is a photographic region or not. A timing adjustment is conducted by the memory 120 on the discrimination result of the photographic region discrimination circuit 119, and then the result is supplied to the AND gate 121. The AND gate 121 finds AND of each discrimination output so that a final discrimination output can be obtained.

Next, an image recognition operation conducted by the apparatus of this example will be explained as follows.

DISCRIMINATION 1

The 45° data generation circuit 101 receives serial image data from a scanner provided outside the apparatus, and outputs 5 data in parallel which are shifted vertically and horizontally by one dot as shown in FIG. 7. The 45° data generated in the aforementioned manner is supplied to the photographic region discrimination circuit 119. In the photographic region discrimination circuit 119, it is discriminated whether it is a character region or a photographic region. That is, when it is discriminated as a character region, a signal of H level is outputted, and when it is discriminated as a photographic region, a signal of L level is outputted. The signal is delayed by the memory 120 in order to make the timing of the signal coincide with other discriminating operations (such as discrimination 2 and discrimination 3). After that, the signal is supplied to the AND gate 121. Since this photographic region discrimination circuit 119 can be realized by the circuit structure or algorithm of the prior art, detailed explanations will be omitted here.

DISCRIMINATION 2

Output of the 45° data generation circuit 101 is supplied to the average value calculation circuit 102. This average value calculation circuit 102 calculates an average ave[x] of density of 45° data composed of 5 dots, wherein the aforementioned average value will be referred to as density information, hereinafter. Density information found in the manner mentioned above, is supplied to the delay section 103, and a plurality of pieces of density information A to P having delay time coincident with one dot, are generated. When it is assumed that the number of pieces of density information is w2 and the first density information is ave[x], the A-th density information can be represented by ave[x−(w2)/2], and the P-th density information can be represented by ave[x+(w2−1)/2]. When a value in the brackets of [ ] is calculated, fractions are discarded so that an integer can be obtained.

The density difference calculation circuit 114 calculates the difference (max[x]−min[x]) between the maximum and the minimum of density information A to P (ave[x-(w2)/2] to ave[x+(w2-1)/2]). This density difference is compared with reference value sh1 which is held by the reference value holding means 115. When (max[x]−min[x]<sh1), there is a high possibility that it is a horizontal line of a constant density. Accordingly, it is discriminated as a horizontal line (a character region), so that "H" is outputted.

DISCRIMINATION 3

Average value shm[x] which is found from density information ave[x] by the average value calculation circuit 104, can be represented by shm[x]=(1/w2)Σave[i] where i is from [x−(w2)/2] to [x+(w2−1)/2]. Average value shm[x] and density information ave[x] are compared with each other by the group of comparators 106. After that, outputs of comparators 106 which are adjacent to each other, are supplied to the input terminal of exclusive OR composing the density cycle detection means 107. When the outputs of comparators adjacent to each other are the same, "0" is outputted from exclusive OR. When the outputs of comparators adjacent to each other are different, "1" is outputted from exclusive OR. In this case, when the output of exclusive OR is "1", the outputs of comparators adjacent to each other are respectively different, and the density information is fluctuating with regard to the average value. In the case where the change of density information is observed not less than a predetermined number of times in a predetermined range, there is a high possibility that the region is a halftone image. Accordingly, when the comparator 110 detects that output count[x] of the counter 108 is higher than a predetermined reference value len1 (for example, len1=4) which is held by the reference value holding means 109, the comparator outputs "L" which shows that the image is a halftone image.

In general, the dimension of a halftone image is not less than a predetermined value, so that the halftone image does not appear or disappear at a unit of several pixels. However, the detection method of this example is not necessarily perfect, so that small mis-discrimination occurs intermittently in the process of halftone image discrimination. In order to eliminate a portion which has been mistakenly discriminated, the following processing is conducted.

In the case where the output of the comparator 110 is "L", the priority photographic region determination circuit 111 gives a command to the priority photographic region memory 112 and outputs signal "L" which shows that the region is wide on both sides by an amount coincident with a predetermined number of dots len2 (for example, len2=1), and shows that the region is a continuous tone region. The content of the priority photographic region memory 112 is outputted into the AND gate 121 at a predetermined timing.

The results of discrimination performed in the aforementioned discrimination processes 1, 2 and 3 are finally supplied to the AND gate 121. Consequently, when all of the three inputs supplied to the AND gate 121 are "H", the region is discriminated as a character region, and when even one of them is "L", the region is discriminated as a photographic region.

PRIORITY PHOTOGRAPHIC DISCRIMINATION

In the aforementioned discrimination 3, the halftone dot region is extended on both sides by len2 respectively. In the case of the pixels (including the region extended in len2) which have been discriminated as a halftone image in discrimination 3, the output becomes "L" when the input of the AND gate 121 is "L". Therefore, the region is not discriminated as a character region in the following processing. Consequently, the result of discrimination can be determined. However, discrimination itself is conducted.

In the case where pixel (x, y) is discriminated as a halftone dot in the process of the aforementioned discrimination 3, pixels from (x−len2, y) to (x+len2, y) are forcibly changed to a halftone dot region (which is referred to as a priority halftone dot region). In the case where a halftone dot region has been detected again while the region of pixel (x+1, y) is being discriminated, the region from (x+1−len2, y) to (x+1+len2, y) is forcibly set to be a halftone dot region.

As described above, in the present invention, luminance or density data of a plurality of pixels having a predetermined inclination angle θ is grouped, and a change, the cycle of which is not more than a predetermined value, is detected so that image recognition is performed. Therefore, a halftone dot and a character can be accurately discriminated.

Therefore, as compared with a conventional method in which image discrimination is performed in such a manner that higher harmonic components of an image signal are reduced with a low-pass filter and the signal is compared with a reference value, image discrimination can be performed more accurately in the present invention. This is very effective in the process of discrimination between a character image and a halftone dot image.

Figure 9:
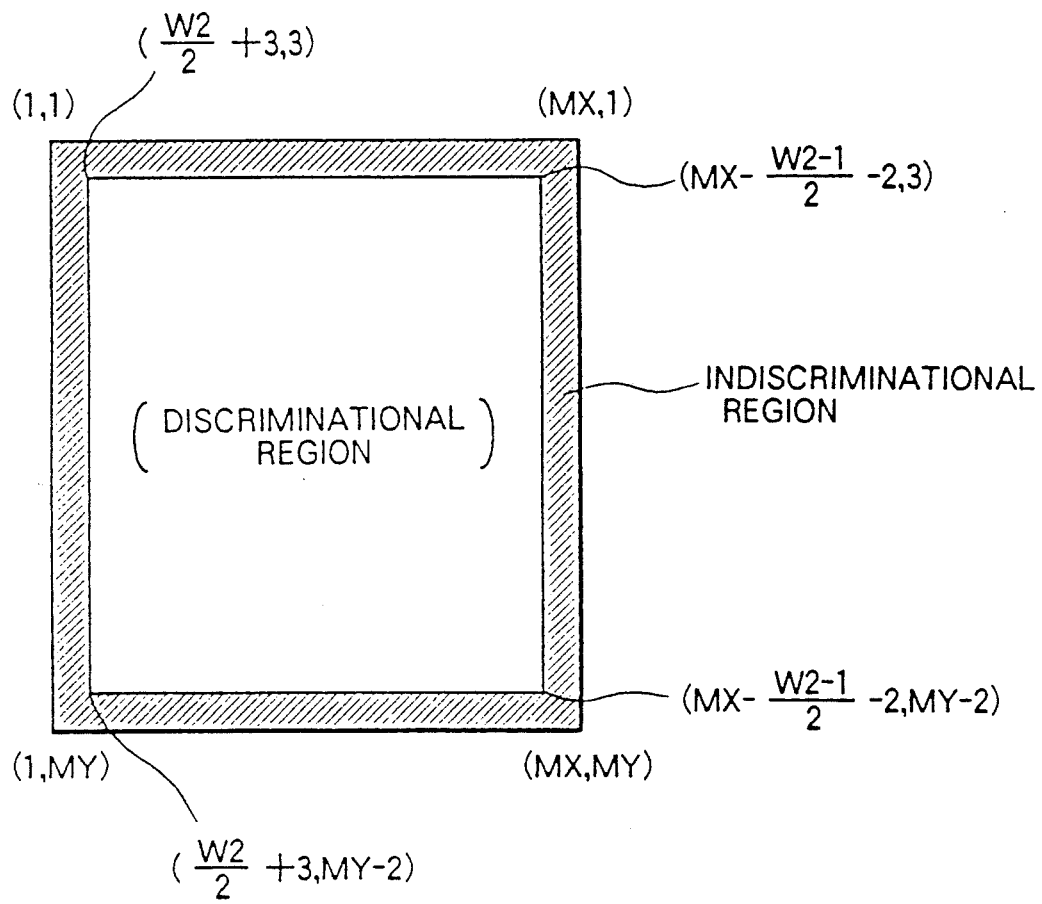
FIG. 9 is a schematic illustration showing a region which has not been discriminated.

When an image is discriminated, it is necessary to group a plurality of pixels in the direction of 45°. Accordingly, a region which can not be discriminated, appears outside the image region. The range of this region is shown in FIG. 9. In the case of the aforementioned example, the range of the region is (w2/2+2) pixels in the X direction, and 2 pixels in the Y direction. Accordingly, when this region which can not be discriminated, is previously determined to be a photographic region, problems caused in image processing can be prevented.

Figure 10:
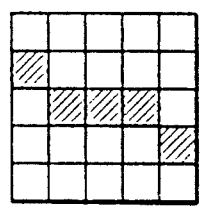
FIG. 10 is a a schematic illustration showing the circumstances in which luminance or density data of a plurality of pixels having inclination angle of 30° is grouped.
Figure 11:
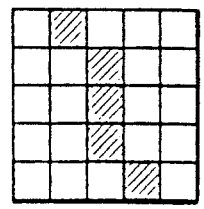
FIG. 11 is a schematic illustration showing the circumstances in which luminance or density data of a plurality of pixels having inclination angle of 60° is grouped.

In the explanation mentioned above, the inclination angle is 45°. The reason is that a common screen angle of a monochromatic halftone dot image is mostly 45° or 90°. Therefore, when halftone dots are grouped under the condition that the inclination angle is 45°, the best discrimination result can be obtained. It is also possible to adopt the inclination angles of 30° and 60° or the inclination angles of not less than 30° and not more than 60°. In the case of the inclination angle 30°, grouping is conducted in the manner shown in FIG. 10, and in the case of the inclination angle 60°, grouping is conducted in the manner shown in FIG. 11. In these cases, discrimination can be also performed excellently.

A halftone dot image in which a plurality of different screen angles of a plurality of colors are utilized, can be previously discriminated as a photographic image by a conventional method (in this example, discrimination 1).

As explained above, in the second example of the present invention, when an image in which a character image and a halftone dot image are mixed, is discriminated, luminance or density data of a plurality of pixels having a predetermined inclination angle θ is grouped so that a change of luminance or density data, the cycle of which is not more than a predetermined period, is detected. In the manner mentioned above, image discrimination is performed, so that a halftone dot image and a character image can be accurately discriminated.

Therefore, an image recognition apparatus which can accurately discriminate a halftone dot image and a character image, is realized.

When the inclination angle is set at not less than 30° and not more than 60° in the process of grouping, and more preferably when the inclination angle is set at 45°, an image can be accurately discriminated in a condition appropriate to the screen angle of the halftone dot image.

Figure 12:
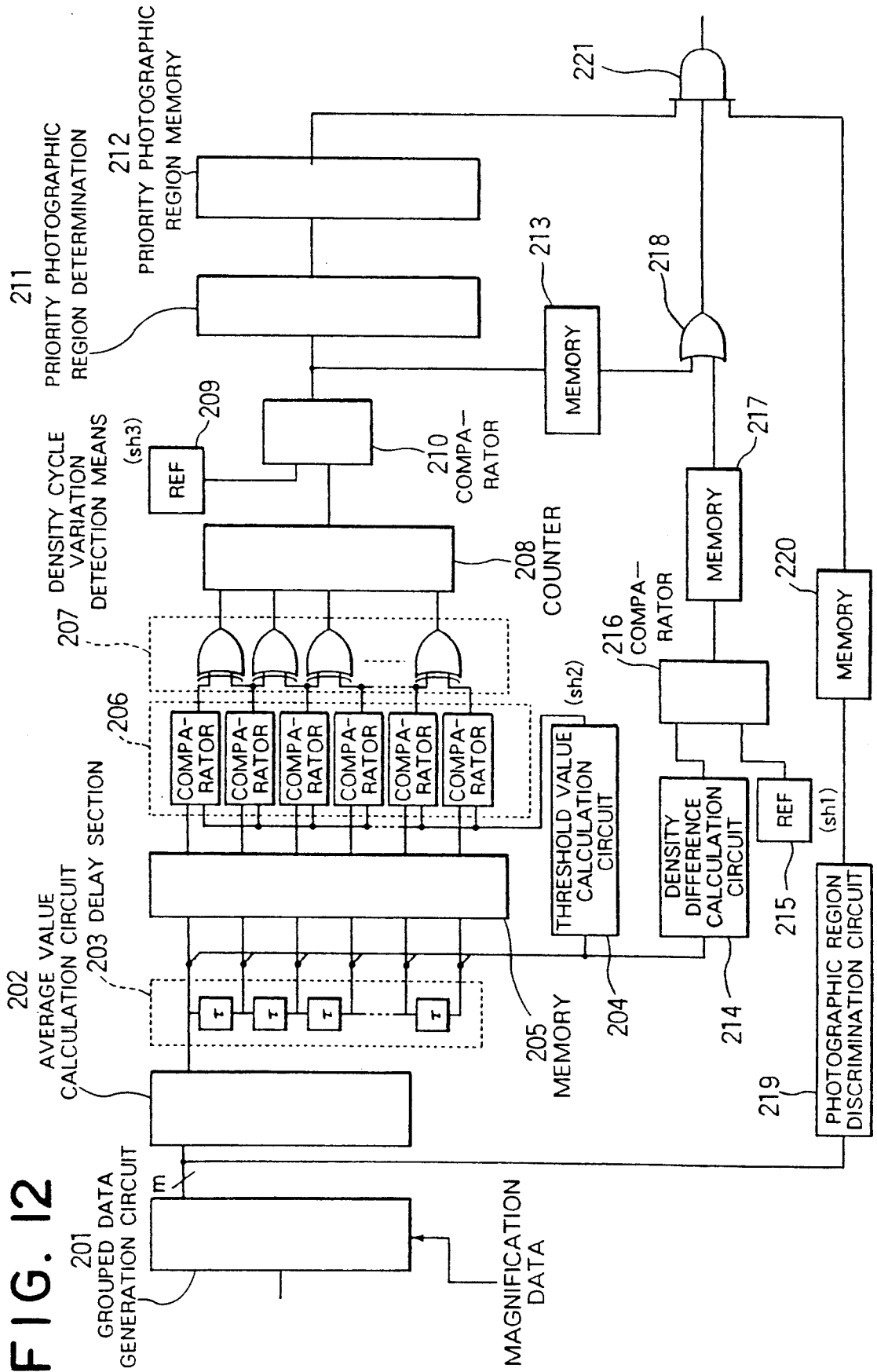
FIG. 12 is a schematic illustration showing the structure of the third example of the present invention.
Figure 13:
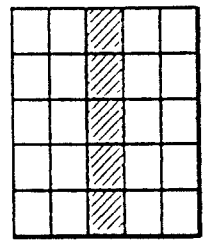
FIG. 13 is a schematic illustration showing the circumstances in which density data of a plurality of pixels having an inclination angle of 45° is grouped.
Figure 14:
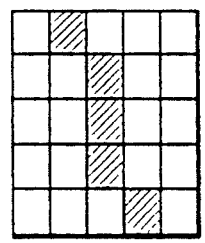
FIG. 14 is a schematic illustration showing the circumstances in which density data of a plurality of pixels having an inclination angle of 45° is grouped.
Figure 15:
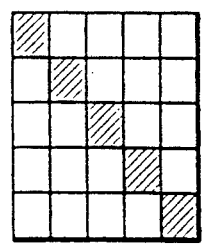
FIG. 15 is a schematic illustration showing the circumstances in which density data of a plurality of pixels having an inclination angle of 45° is grouped.
Figure 16:
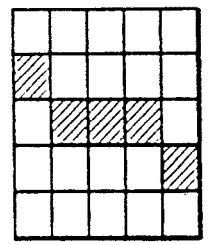
FIG. 16 is a schematic illustration showing the circumstances in which density data of a plurality of pixels having an inclination angle of 45° is grouped.
Figure 17:
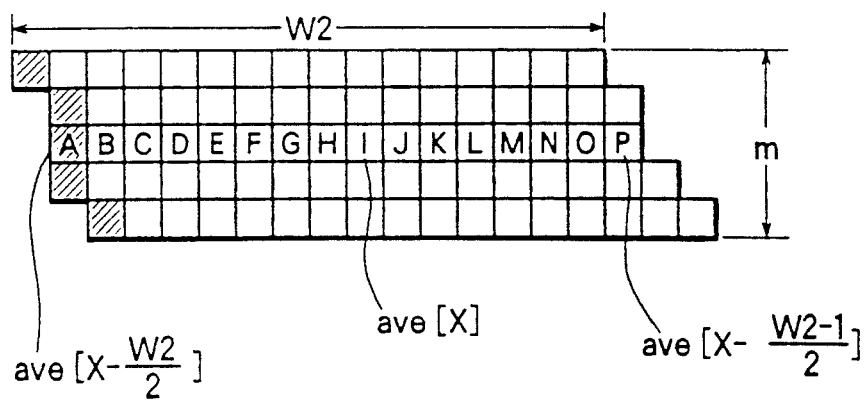
FIG. 17 is a schematic illustration showing a periodic change of grouped density information.

With reference to the attached drawings, the third example of the present invention will be explained as follows. FIG. 12 is a schematic illustration showing the entire structure of the third example. In the structure shown in the drawing, a group data generation circuit 201 generates m pieces of grouped data from image data sent from a scanner, wherein the data are shown in FIGS. 13 to 16. The group data generation circuit 201 includes a plurality of line memories or field (frame) memories, and a memory control circuit. In accordance with the magnification in the auxiliary scanning direction, data are collected in a different manner as shown in FIGS. 13 to 16. An average value calculation circuit 202 calculates an average of density values of m pieces of image data (in this case, m=5) outputted from a grouped data generation circuit 201. A delay section 203 includes a plurality of (the number is w2) delay elements having delay time coincident with one clock in the horizontal direction. In the case shown in FIG. 17, grouping is performed under the condition shown in FIG. 14. A threshold value calculation circuit 204 finds average value shm[x] of density information A to P generated in the delay section 203. On the other hand, the memory 205 generates delay time equal to the calculation time of the threshold value calculation circuit 204, and each output of the delay section 203 is supplied to a group of comparators 206. The comparators 206 compare average value shm[x] found by the threshold value calculation circuit 204 with density information A to P. The density cycle variation detection means 207 including a plurality of exclusive "or" circuits takes exclusive OR of the outputs of the comparators 206 which are adjacent to each other. A counter 208 counts output "1" of the density cycle variation detection means 207. A reference value holding means 209 holds a reference value with respect to density cycle variation, and this reference value and the result of counting conducted by the counter 208 are compared with each other by the comparator 210. A priority photographic region determination means 211 receives the output of the comparator 210, and commands a priority photographic region memory 212 to set a priority photographic region. Receiving this command, the priority photographic region memory 212 sets a priority photographic region, both sides of which are provided with a margin coincident with a predetermined number of pixels.

A density difference calculation circuit 214 calculates the difference between the maximum and the minimum of a plurality of pieces of density information (in this case, A to P) generated by the delay section 203. A comparator 216 compares the density difference with a predetermined reference value held by a reference value holding means 215. Timing of the comparison result is adjusted by the memory 217, and then supplied to an OR gate 218 together with the comparison output of the comparator 210, the timing of which has been adjusted by the same memory 213. OR output of the OR gate 218 is supplied to an AND gate 221 which will be described later.

Referring to density information generated by the group data generation circuit 201, a photographic region discrimination circuit 219 discriminates whether it is a photographic region or not. Timing of the result of discrimination of the photographic region discrimination circuit 219 is adjusted by a memory 220, and the result of the discrimination is supplied to the AND gate 221. When the AND gate 221 finds an AND of each discrimination output, a final discrimination output is obtained.

Next, image recognition operations of the apparatus of this example will be explained as follows.

DISCRIMINATION 1

The group data discrimination circuit 201 receives serial image data from a scanner provided outside the apparatus, and outputs m pieces of data which are shifted in the primary or auxiliary direction by one dot as shown in FIGS. 13 to 16. At this time, the grouped data generation circuit 201 refers to magnification data used in a magnifying operation given through a CPU of a copier, and changes the combination of grouping in such a manner that the order of memory reading is changed. The grouped data generated in the manner mentioned above, is supplied to the photographic region discrimination circuit 219. In the photographic region discrimination circuit 219, a character region and a photographic region are discriminated. That is, when it is judged to be a character region, a signal of "H" level is outputted, and when it is judged to be a photographic region, a signal of "L" level is outputted. The outputted signal is delayed by the memory 220 so that the timing of the signal can be adjusted with other discriminations (discrimination 2 and discrimination 3), and then the signal is supplied to the AND gate 221. This photographic region discrimination circuit 219 can be realized by the circuit structure or the algorithm (to detect that a local density change is small) in the prior art, so that the detailed explanation will be omitted here.

DISCRIMINATION 2

Output of the group data generation circuit 201 is supplied to the average value calculation circuit 202. The average value calculation circuit 202 calculates density average (referred to as density information) ave[x] of m pieces of grouped data. Density information found in this manner is supplied to the delay section 203, so that a plurality of pieces of density information A to P having delay time coincident with one dot are generated. When it is assumed that the number of density information is w2 and the first density information is ave[x], the A-th density information can be represented by ave[x−(w2)/2] and the P-th density information can be represented by ave[x+(w2−1)/2]. In this case, with regard to the result of calculation in the brackets [ ], fractions are discarded so that an integer can be obtained.

A density difference calculation circuit 214 finds the difference (max[x]−min[x]) between the maximum and the minimum of density information A to P (ave[x−(w2)/2] to ave[x+(w2−1)/2]). This density difference is compared with reference value sh1 held in the reference value holding means 215. When (max[x]−min[x]<sh1), there is a high possibility that the region is a horizontal line having a predetermined density. Accordingly, it is recognized that the region is a horizontal line (a character region) and "H" is outputted.

Average value shm[x] which is found from density information ave[x] by the threshold value calculation circuit 204 can be represented by shm[x]=(1/w2)Σave[i] (in this case, i is from [x−(w2)/2] to [x+(w2−1)/2]). Average value case, i is from [x-(w2 shm[x] and density information ave[x] are compared with each other by the group of comparators 206. After that, comparator outputs adjacent to each other are inputted into the input terminal of the exclusive "or" circuit composing the density cycle variation detection means 207. Due to the foregoing, when the comparator outputs adjacent to each other are the same, "0" is outputted from the exclusive "or" circuit, and when the comparator outputs adjacent to each other are different, "1" is outputted from the exclusive "or" circuit. As described above, when the output of the exclusive "or" circuit is "1", the comparator outputs adjacent to each other are different, so that pieces of density information adjacent to each other are varied upwards and downwards with regard to the average value. When density variations, the frequency of which is not less than a predetermined value, are observed in a predetermined range, there is a high possibility that the region is a halftone dot image. Accordingly, when it is detected by the comparator 210 that count output count[x] of the counter 208 is higher than a predetermined reference value len1 (for example, len1=4) held by the reference holding means 209, the comparator outputs "L" which shows that the region is a halftone image.

In general, the size of a halftone dot image is larger than a predetermined value, so that the halftone dot image does not appear or disappear in a unit of several pixels. However, the detection conducted by the method shown in this example, is not perfectly correct, so that small misjudgments occur intermittently during the discrimination of halftone dot images. In order to remove this occasional misjudgment, the following processing is conducted.

In the case where output of the comparator 210 is "L", the priority photographic region determination means 211 gives a command to the priority photographic region memory 212, and outputs signal "L" showing that it is a continuous tone region, wherein both sides coincident with a predetermined number of dots len2 (for example, len2=1) are a continuous tone region. After timing is adjusted, the content of the memory 212 is outputted into the AND gate 221.

Results of discriminations 1, 2 and 3 are finally inputted into the AND gate 221. Consequently, when all inputs of discriminations 1, 2 and 3 inputted into the AND gate 221 are "H", the region is recognized as a character region, and even when one of then is "L", the region is recognized as a photographic region.

PRIORITY PHOTOGRAPHIC DISCRIMINATION

In the aforementioned discrimination 3, the halftone dot region is extended on both sides respectively by len2. When input of the AND gate 221 becomes "L", output of pixels (including a region extended by len2) which have been discriminated to be a halftone dot by discrimination 3, also becomes "L", so that the region is not discriminated as a character region in the processing conducted successively. Accordingly, the result of discrimination is determined preferentially. However, discrimination itself is conducted.

In the case where pixel (x, y) is discriminated as a halftone dot in the process of the aforementioned discrimination 3, pixels from (x−len2, y) to (x+len2, y) are forcibly changed to a halftone dot region (which is referred to as a priority halftone dot region). In the case where a halftone dot region has been detected again while the region of pixel (x+1, y) is being discriminated, the region from (x+1−len2, y) to (x+1+len2, y) is forcibly set to be a halftone dot region.

As described above, in the present invention, data of a plurality of pixels are grouped, and a periodic change of density of the grouped data is detected, so that image recognition is performed. Therefore, a halftone dot and a character can be accurately discriminated. Further, the combination of grouping is changed according to the magnification when the magnification is varied, so that a halftone dot region is not mistaken for a character region in the process of magnification.

Therefore, image recognition can be performed more accurately than by the method in the prior art. This effect can be remarkably provided when a character image and a halftone dot image are recognized.

Figure 18:
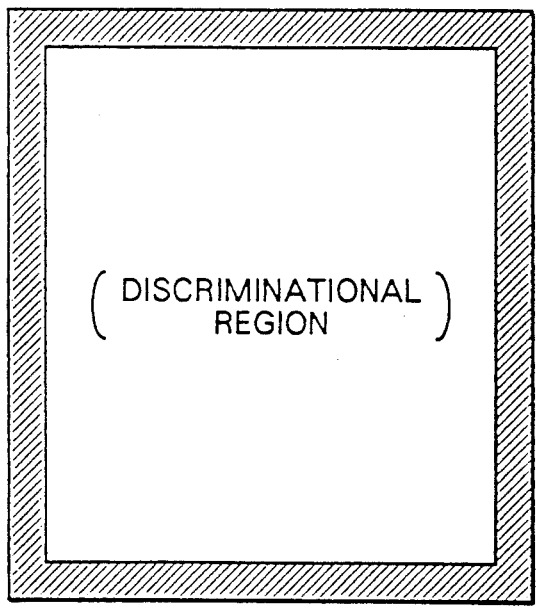
FIG. 18 is a schematic illustration showing a region which has not been discriminated.

When an image is recognized, it is necessary to group a plurality of pixels diagonally, so that a region which can not be discriminated, appears outside the image region. This region is shown in FIG. 18, and changes according to the combination of grouping. When this region which can not be discriminated, or is previously determined to be a photographic region, problems can be prevented in the process of image processing.

As explained above, in the third example of the present invention, when an image is recognized in which a character image and a halftone dot image are mixed, density information of a plurality of pixels having an inclination angle coincident with the magnification, is grouped and averaged, and a periodic change of the average density is detected so that image recognition is performed. Therefore, even when the magnification is varied, a halftone dot region and a character region can be accurately discriminated. According to the present invention, an image recognition apparatus can be realized by which a halftone dot image and a character image can be correctly recognized.

What is claimed is:

1. An image processing apparatus for processing image signals corresponding to an image including a character image region, a halftone image region, and a continuous tone image region, the apparatus comprising:

means for generating first image signals corresponding to said character image region, and second image signals corresponding to said halftone image region and said continuous tone image region, from said image signals;

means for processing said first image signals; and means for processing said second image signals;

wherein said generating means includes:

means for converting said image signals into binarized image signals, expressing said image with a black pixel and a white pixel, according to the density level of respective pixels of said image;

means for recognizing partial image regions, each of which has a predetermined number of pixels in said image, said recognizing means recognizing whether said partial image regions are black regions in each of which said black pixel exists in more than a predetermined number, or said partial image regions are non-black regions in each of which none of said black pixels exists, so that said image comprises at least one of the group of said black regions and the group of said non-black regions; and means for estimating a continuous length of said black regions.

2. An image processing apparatus for processing pixel image signals corresponding to an original image including a character image region, a halftone image region, and a continuous tone image region, the apparatus comprising:

means for generating first image signals corresponding to said character image region, and second image signals corresponding to said halftone image region and said continuous tone image region, from said image signals;

means for processing said first image signals; and means for processing said second image signals;

wherein said generating means includes:

means for averaging pixel density data of said pixel image signals wherein said pixel image signals are lined in a memory map, having a horizontal direction and a vertical direction, at a predetermined inclination angle to said horizontal direction; and means for estimating a periodicity of said averaged density data.

3. The image processing apparatus of claim 2, wherein said predetermined inclination angle is not less than 30° and not more than 60°.

4. The image processing apparatus of claim 3, wherein said predetermined inclination angle is 45°.

5. The image processing apparatus of claim 3, wherein said estimating means determines a fluctuation when said averaged density data are over and under a predetermined threshold value.

6. An image processing apparatus for processing pixel image signals corresponding to an original image including a character image region, a halftone image region, and a continuous tone image region, the apparatus comprising:

means for scanning said original image at a variable magnification to obtain said pixel image signals with magnification data;

means for generating first image signals corresponding to said character image region, and second image signals corresponding to said halftone image region and said continuous tone image region, from said image signals;

means for processing said first image signals; and means for processing said second image signals;

wherein said generating means includes:

means for holding said magnification data when said image signals are generated;

means for calculating an inclination angle according to said magnification data;

means for averaging pixel density data of said pixel image signals wherein said pixel image signals are lined in a memory map, having a horizontal direction and a vertical direction, at said inclination angle relative to said horizontal direction; and means for estimating a periodicity of said averaged density data.

7. The image processing apparatus of claim 6, wherein said estimating means determines a fluctuation when said averaged density data are over and under a predetermined threshold value.

* * * * *